US012076703B2

(12) United States Patent
Faucher et al.

(10) Patent No.: US 12,076,703 B2
(45) Date of Patent: Sep. 3, 2024

(54) PROCESS FOR INSTALLING A SECTION OF PACKING IN A CASING

(71) Applicant: L'Air Liquide, Societe Anonyme pour l'Etude et l'Exploitation des Procedes Georges Claude, Paris (FR)

(72) Inventors: Vincent Faucher, Champigny sur Marne (FR); Manuel Dos Reis, Vitry sur Seine (FR); Vincent Maret, Vitry sur Seine (FR); Luis Torbado, Vitry sur Seine (FR); Alain Appel, Vitry sur Seine (FR); Eric Biret, Vitry sur Seine (FR); Laurent Leclerc, Vitry sur Seine (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 18/084,474

(22) Filed: Dec. 19, 2022

(65) Prior Publication Data

US 2023/0191359 A1 Jun. 22, 2023

(30) Foreign Application Priority Data

Dec. 22, 2021 (FR) ...................................... 2114214

(51) Int. Cl.
*B23P 11/02* (2006.01)
*B01D 3/32* (2006.01)
(Continued)

(52) U.S. Cl.
CPC .............. *B01J 19/325* (2013.01); *B01D 3/32* (2013.01); *B23P 11/02* (2013.01); *B23P 15/00* (2013.01);
(Continued)

(58) Field of Classification Search
CPC ............ B01J 19/325; B01J 2219/32275; B01J 2219/32279; B01J 2219/32282;
(Continued)

(56) References Cited

U.S. PATENT DOCUMENTS

| 6,202,305 B1 | 3/2001 | Bracque et al. |
| 10,933,345 B2 | 3/2021 | Kanzler |

(Continued)

FOREIGN PATENT DOCUMENTS

| DE | 31 49 450 | 12/1982 | |
| DE | 102007021493 A1 * | 11/2008 | .............. B23P 11/02 |

(Continued)

OTHER PUBLICATIONS

Translation of DE-102007021493-A1 (Year: 2008).*
French Search Report for FR 2 114 214, dated Jul. 8, 2022.

*Primary Examiner* — Matthew P Travers
(74) *Attorney, Agent, or Firm* — Justin K. Murray (57) ABSTRACT

A process for installing a section of packing in a casing by means of a device to assist installation of a section of packing, the casing comprising at least one tubular wall extending in a longitudinal direction (L) between two longitudinal ends, and an inner face of which participates in delimiting a receptacle for the section of packing, the casing being positioned horizontally during the process for installing the section of packing, the process comprising a step of fitting of the device to assist installation on the casing, during which the device to assist installation is secured in the vicinity of the input opening of the casing, a step of positioning of the section of packing relative to the device to assist installation and to the input opening, and at least one step of pushing during which the section of packing is pushed into the receptacle of the casing.

8 Claims, 4 Drawing Sheets

(51) Int. Cl.
*B01J 19/32* (2006.01)
*B23P 15/00* (2006.01)
*B23P 19/12* (2006.01)

(52) U.S. Cl.
CPC ..... *B23P 19/12* (2013.01); *B01J 2219/32275* (2013.01); *B01J 2219/32279* (2013.01); *B01J 2219/3306* (2013.01)

(58) Field of Classification Search
CPC . B01J 19/32; B23P 19/10; B23P 19/12; B23P 11/02; B23P 15/00; B01D 3/32; B25B 11/00
See application file for complete search history.

(56) References Cited

U.S. PATENT DOCUMENTS

| | | | |
|---|---|---|---|
| 2002/0121711 A1 | 9/2002 | DeGarmo | |
| 2005/0086782 A1* | 4/2005 | Kasten | F01N 3/2853 29/525 |
| 2007/0212269 A1* | 9/2007 | Kobayashi | B23P 11/005 29/890 |
| 2014/0345102 A1 | 11/2014 | Granger | |

FOREIGN PATENT DOCUMENTS

| | | |
|---|---|---|
| EP | 0 913 655 | 5/1999 |
| WO | WO 2017/153057 | 9/2017 |

\* cited by examiner

PROCESS FOR INSTALLING A SECTION OF PACKING IN A CASING

CROSS-REFERENCE TO RELATED APPLICATIONS

This application claims the benefit of priority under 35 U.S.C. § 119 (a) and (b) to French patent application No. FR 2114214, filed Dec. 22, 2021, the entire contents of which are incorporated herein by reference.

FIELD OF THE INVENTION

The present invention relates to the field of gas/liquid separation columns, and to their assembly, and it concerns more particularly a process for installing a section of packing in a casing in order to form these said gas/liquid separation columns.

BACKGROUND OF THE INVENTION

Gas/liquid separation columns have been known for many years and allow, for example, various chemical elements incorporated in the composition of a homogeneous fluid to be separated, for example, by distillation or by absorption.

The production of a gas/liquid separation column comprises in particular a step of insertion of a plurality of packing sections within a casing. The sections of packing are used in the columns in particular in order to ensure the exchange of material and heat between a rising gas and a descending liquid. These packing sections, which are constituted in particular by superimposition of a plurality of undulating strips, are often known as "packs". The sections of packing are conventionally stacked on one another, if applicable with interposed separators, in order to participate in the separation of the components of the fluid over the axial dimension of the column.

It is known to proceed with the insertion of the sections of packing within a casing which is kept vertical, with the force of gravity facilitating greatly the progression of the section of packing inserted within the casing. However, a process of this type can prove to be restrictive when the gas/liquid separation columns to be assembled have a large diameter and an axial dimension which requires use of casings with long lengths, of approximately several tens of metres. In fact, processes of this type with vertical insertion of the sections of packing then require tooling which can raise the sections of packing over a long distance, in order to put them facing the end of the casing, as well as a production site with a height of ceiling which is greater than the length of the casing.

For the casings with a long length, it is therefore desirable to provide an assembly process wherein the insertion of the sections of packing is carried out with the casing arranged horizontally. A position of this type makes it difficult to insert sections of packing, because of the fact that the said insertion requires a considerable push force along the entire length of the casing, with gravity no longer intervening as a force for accompanying the movement of the section of packing within the casing.

This force of gravity can also give rise to slight deformation of the casing, and make it complicated to centre the section of packing relative to an input opening of the casing, facing which the section of packing must be positioned before being pushed into the interior of this casing.

In an installation of this type, and with insertion of the sections of packing horizontally, it is difficult to position the section of packing facing the input opening of the casing upstream from the pushing thereof into the interior of the casing, and even more so to maintain the section in position when the section of packing is disengaged from its means of transport so that it can be inserted by an appropriate pushing means. It is then necessary to make the pushing means intervene very quickly in order for the pushing of the section of packing to take place as soon as the section of packing is facing the opening, with gravity tending to offset the section of packing vertically from the input opening of the casing which is installed horizontally, when the section of packing is released by its means of transport.

SUMMARY OF THE INVENTION

According to certain embodiments of the present invention, there is a process for installing a section of packing in a casing by means of a device to assist installation of a section of packing, the casing comprising at least one tubular wall extending in a longitudinal direction between two longitudinal ends, and an inner face of which participates in delimiting a receptacle for the section of packing, the tubular wall participating in delimiting an input opening at one of its longitudinal ends, the casing comprising a base wall positioned at the longitudinal end of the tubular wall opposite the input opening, the casing being positioned horizontally during the process for installing the section of packing, the process comprising a step of fitting of the device to assist installation on the casing during which the device to assist installation is secured in the vicinity of the input opening of the casing, a step of positioning of the section of packing facing the input opening, in cooperation with the device to assist installation, and at least one step of pushing during which the section of packing is pushed into the receptacle of the casing.

The casing advantageously and globally has a cylindrical form extending in the longitudinal direction, this direction being parallel to the axis of revolution of the said cylinder. It is understood from the foregoing, and from the assembly of the casing horizontally, that the longitudinal direction is substantially parallel to the ground on which the casing is installed during the process for installing the section of packing. This particular arrangement of the casing relative to the ground facilitates the insertion of the section of packing when the casing has a length, measured in a direction parallel to the longitudinal direction, and a diameter, corresponding to the diameter of the cylinder, equal to approximately ten metres and/or more for example. However, a process of this type for installation of a section of packing can also be applied to the installation of a section of packing in a casing, the length and/or diameter of which are less than approximately ten metres.

The step of fitting the device to assist installation on the casing is carried out upstream from the step of positioning and the step of pushing. The device to assist installation is advantageously secured in the vicinity of the input opening, in order to assist the fitting of the section of packing in the casing, such as to ensure the correct positioning of these two elements relative to one another, and to reduce the risk of deformation of the casing and/or of the section of packing during the pushing of one into the other. The securing is advantageously detachable securing, in order for the device to assist installation to be able to be removed once all of the sections of packing are positioned in the interior of the casing. For example, the device to assist installation is secured by screwing between the said device to assist installation and the tubular wall of the casing.

It is understood that the device to assist installation adopts a first position, in which the device to assist installation is integral with the casing, and a second position, in which the device to assist installation is separated from the casing.

During the step of positioning of the section of packing, the section of packing is positioned relative to the device to assist installation in order to facilitate the insertion of the section of packing into the casing, i.e. the device to assist installation is configured such that the section of packing is correctly centred when it is supported on the device to assist installation. By this means, it is possible subsequently to push the section of packing easily into the casing, and therefore reduce the friction forces against the inner face of the tubular wall.

According to an optional characteristic of the invention, during the positioning step, a means of transport for the section of packing retains the section of packing facing the input opening at least until the said section of packing is positioned against the device to assist installation. In particular, the means of transport can be formed by a device for insertion of the section of packing which comprises both means for retention of a section of packing, and pushing means for this section of packing. The means of transport can also be a system which carries sections of packing independently from a pushing means.

According to another optional characteristic of the invention, the device to assist installation comprises at least one cradle which is configured to position the section of packing facing the input opening, with the process for installing the section of packing comprising a step of fitting the cradle on the casing, during which the cradle is secured on a lower portion of the casing in the vicinity of the input opening. "Lower portion" means a portion of the casing in the vicinity of the ground on which the casing is supported, this arrangement being understood relative to a vertical direction which is substantially perpendicular to the longitudinal direction.

According to another optional characteristic of the invention, the device to assist installation of a section of packing comprises a removable cone, the process for installing the section comprising a step of fitting a removable cone on the casing, and at least one step of centring during which the removable cone centres the section of packing relative to the input opening of the casing.

According to another optional characteristic of the invention, the removable cone is secured on an upper portion of the casing in the vicinity of the input opening. "Upper portion" means a portion of the casing opposite the ground on which the casing is supported relative to the lower part, this arrangement being understood relative to a vertical direction which is substantially perpendicular to the longitudinal direction.

The subject of the present invention is also a device to assist installation implemented during the process for installing the section of packing in a casing, characterised according to any one of the preceding characteristics.

According to another optional characteristic of the invention, the device to assist installation comprises at least one cradle extending in an extension of at least part of the tubular wall, from the input opening, in the longitudinal direction, opposite the base wall.

According to another optional characteristic of the invention, the cradle has a cross-section which is at least partly circular seen on a plane perpendicular to the longitudinal direction, and inscribed in a circle with a diameter identical to that in which the tubular wall of the casing is inscribed. In other words, the cradle extends in the extension of the casing, with a curvature similar to that of the casing.

According to another optional characteristic of the invention, the cradle extends around at least 25% of the circumference of the input opening of the casing. In this case, it is understood that the cross-section of the cradle has globally the form of an arc of a circle, such as to extend on a portion of the circumference of the input opening. Because of the position of the cradle in the lower part, the cradle's only function is to ensure the vertical retention of the section of packing in order to ensure that the vertical position of this section is correct relative to the casing, with the cradle being able to have a circumferential size such that raised edges prevent the section of packing in place on the cradle from tilting laterally. More particularly, the cradle can extend around 33% of the circumference of the input opening of the casing.

According to another optional characteristic of the invention, the cradle has a longitudinal dimension, measured between the input opening of the casing and a free end of the cradle, which is between 75 and 150 mm. The longitudinal dimension, measured parallel to the axis of revolution of the cylinder forming the casing, is greater than 75 mm, in order to permit absorption of forces which is sufficient to support the section of packing during the positioning step, and until the section of packing is pushed into the interior of the casing. Advantageously, the longitudinal dimension is between 90 and 110 mm. Even more advantageously, the longitudinal dimension is 100 mm.

According to another optional characteristic of the invention, the cradle comprises at least one metal material.

According to another optional characteristic of the invention, the cradle comprises stainless steel and/or aluminium.

According to a subject of the invention, a casing is provided comprising an input opening, a tubular wall extending in a longitudinal direction between two longitudinal ends, and an inner face of which participates in delimiting a receptacle for the section of packing, a base wall positioned at the longitudinal end of the tubular wall opposite the input opening, and a device to assist installation, the device to assist installation comprising at least one removable cone, which is configured to guide the fitting of the section of packing by centring the said section of packing on the input opening, the removable cone being installed at the input opening of the casing, the removable cone having a cross-section which is at least partly circular seen on a plane perpendicular to the longitudinal direction, and becoming enlarged going away from the input opening. Here and in the remainder of the document, "removable cone" means that the device to assist installation comprises an element with an at least partly frusto-conical form, forming a neck in the direction of the input opening, in order to guide the insertion of the section of packing into the interior of the casing.

According to another optional characteristic of the invention, the removable cone extends around at least 50% of the circumference of the input opening of the casing. It is understood in this case that the cross-section of the removable cone is globally in the form of an arc of a circle, such as to extend around a portion of the circumference of the input opening.

According to another optional characteristic of the invention, the removable cone extends around at least 67% of the circumference of the input opening of the casing.

According to another optional characteristic of the invention, the removable cone has a longitudinal dimension, measured between the input opening of the casing and a free edge of the removable cone, of between 30 and 50 mm. The longitudinal dimension is greater than 30 mm, in order to be able to centre the section of packing on the opening during the positioning step. Advantageously, the longitudinal dimension is 35 mm.

According to another optional characteristic of the invention, the cradle and the removable cone extend one after the other on all of the circumference of the input opening of the casing.

According to another optional characteristics of the invention, the longitudinal dimension of the cradle is larger than the longitudinal dimension of the removable cone.

According to another optional characteristic of the invention, the removable cone comprises at least one metal material.

According to another optional characteristic of the invention, the removable cone comprises stainless steel and/or aluminium.

According to another optional characteristic of the invention, the removable cone is resiliently deformable between a position of centring and a position of rest.

According to an optional characteristic of the invention, the securing means is positioned permanently on the casing, and is configured to be able to cooperate with a body for attachment of the device to assist installation of the section of packing.

According to an optional characteristic of the invention, the means for securing is a welding bead between the device to assist installation of the section of packing and the casing.

According to another optional characteristic of the invention, the device to assist installation comprises a cradle and/or a removable cone, the attachment body being supported by the cradle and/or the removable cone, the attachment body cooperating with the means for securing in order to render the cradle and/or the removable cone integral with the casing.

BRIEF DESCRIPTION OF THE FIGURES

Other characteristics, details and advantages will become more clearly apparent from reading the following description on the one hand, and from a plurality of embodiments given by way of non-limiting indication, with reference to the appended schematic drawings on the other hand, in which drawings.

DETAILED DESCRIPTION OF THE INVENTION

The characteristics, variants and the different embodiments of the invention can be associated with one another according to various combinations, provided that they are not incompatible or mutually exclusive. In particular, it is possible to conceive of variants of the invention comprising only a selection of characteristics described hereinafter, in a manner isolated from the other characteristics described, if this selection of characteristics is sufficient to provide a technical advantage and/or to differentiate the invention from the prior art.

In the figures, elements which are common to several figures retain the same reference.

Figure 1:
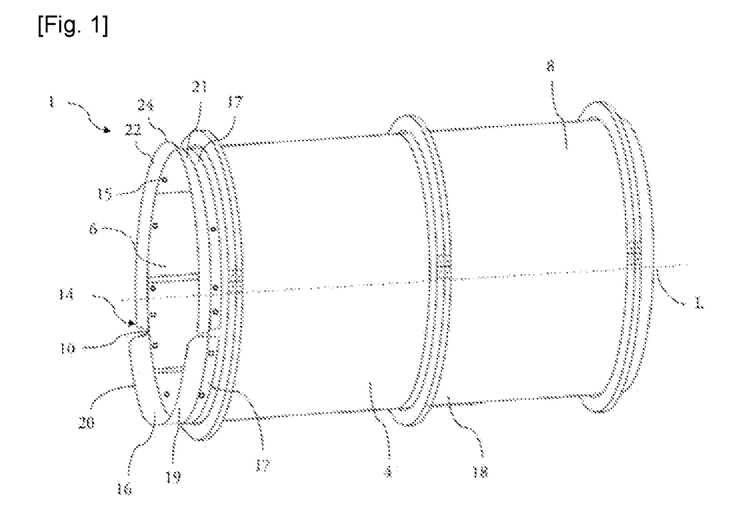
FIG. 1 is a representation in perspective of a casing implemented in the process for installing a section of packing according to the invention.
Figure 2:
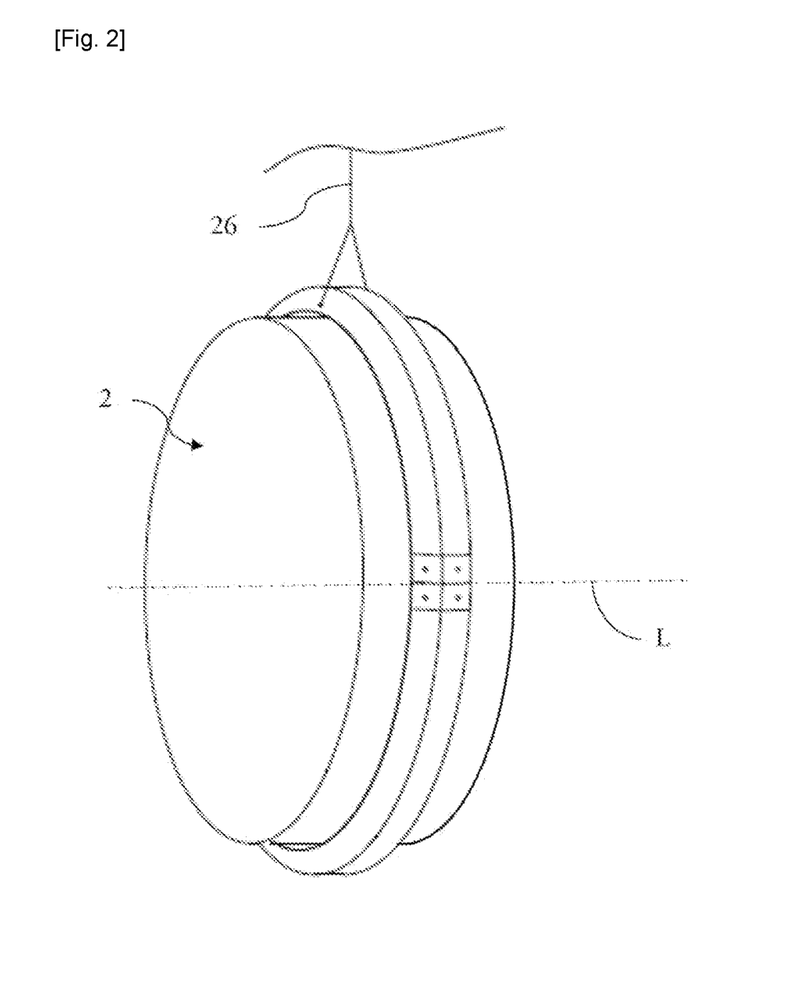
FIG. 2 is a representation in perspective of a section of packing implemented in the process for installing a section of packing according to the invention.

FIG. 1 illustrates a casing 1 implemented in a process for installing a section of packing 2 according to the invention, the section of packing 2 being represented in FIG. 2. This process for installing the section of packing 2 makes it possible to be able to install in the casing 1 a section of packing 2, in particular during installation in a casing which is positioned horizontally, while reducing astutely the risk of deformation of the casing 1 during the said process.

The casing 1 extends mainly in a longitudinal direction L, thus having two longitudinal ends. The casing 1 is positioned horizontally during the process for installing the section of packing 2, i.e. the longitudinal direction L extends substantially parallel to the ground on which the casing 1 is installed.

More particularly, the casing 1 comprises at least one tubular wall 4, which extends mainly in the longitudinal direction L, having globally the form of a straight cylinder, with the longitudinal direction L in this case corresponding to the main direction of extension of the tubular wall 4, and to its axis of revolution. In other words, a cross-section of the tubular wall 4, seen on a plane perpendicular to the longitudinal direction L, is inscribed substantially in a circle.

The tubular wall 4 has an inner face 6 which is oriented towards the interior of the casing 1, and an outer face 8 which faces towards the exterior of the casing 1. The inner face 6 of the tubular wall 4 participates in delimiting a receptacle for at least one section of packing 2, installed in the casing 1 via the installation process according to the invention.

The tubular wall 4 participates in delimiting an intake opening 10 at one of the longitudinal ends of the casing 1. The intake opening 10 corresponds to the opening via which the sections of packing 2 are inserted into the casing 1 during the said installation process.

Figure 4:
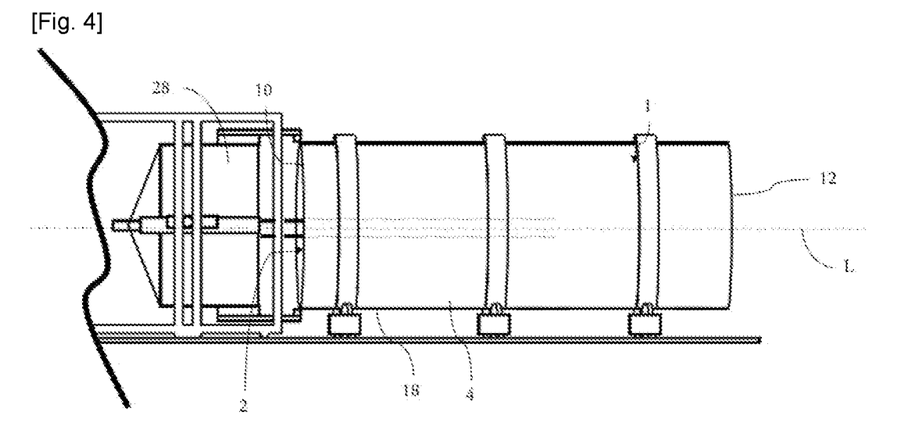
FIG. 4 is a representation seen from the side of a step of pushing of the process for installing a section of packing according to the invention.

The casing 1 comprises a base wall 12, shown in FIG. 4, positioned at the other longitudinal end of the casing 1, i.e. opposite the intake opening 10. At least the first section of packing 2 installed in the casing 1 is positioned in the vicinity of the base wall, if applicable against the base wall 12.

Figure 3:
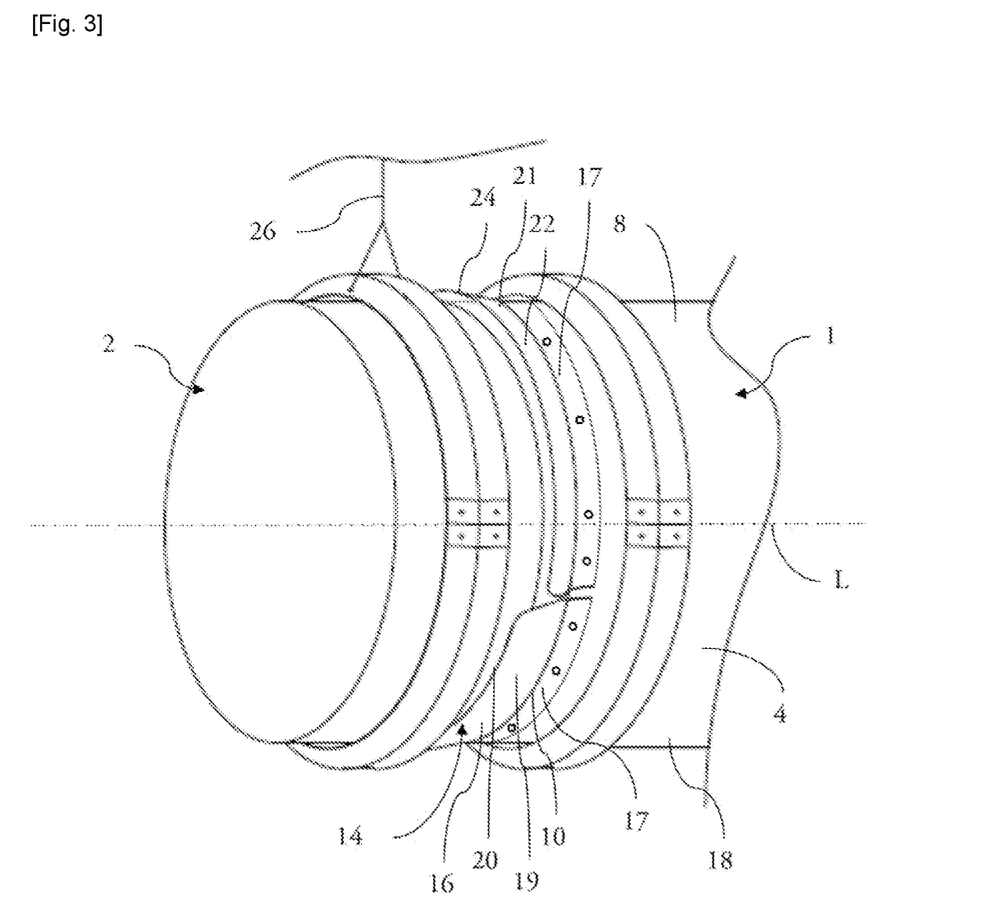
FIG. 3 is a representation in perspective of a step of positioning of the process for installing a section of packing according to the invention.

The section of packing 2, as illustrated in FIGS. 2 and 3, has globally the form of a cylindrical body which can be installed in the receptacle of the tubular wall 4. In other words, the section of packing 2 has a peripheral edge 8, the profile of which, seen on a plane perpendicular to the longitudinal direction L, is a circle, the diameter of which is equal to, or substantially smaller than, the diameter of the casing at the inner face of the tubular wall 4.

As previously stated, a section of packing is in particular constituted by a superimposition of a plurality of undulating and interlaced strips, and, during the operation of the gas/liquid separation column comprising this casing, the stacking of these sections within a casing makes it possible to ensure the exchange of material and heat between a rising gas and a descending liquid. The sections of packing are conventionally stacked on one another, if applicable with separators interposed. Obtaining a separation column thus involves insertion of sections of packing within the casing one after another, via an appropriate insertion device, during a process for installing sections of packing.

According to the invention, the process for installing a section of packing 2 in a casing 1 is carried out by means of a device 14 to assist installation of a section of packing 2, which device is more particularly positioned in the vicinity of the longitudinal end of the casing 1 forming the input opening 10. As will be described, this device 14 to assist installation is a removable device, which is secured on the casing 1 only during the process for installing a section of packing within the casing, with the casing in a horizontal position, and which device is then removed, in particular when the casing adopts a vertical functional position once more.

For this purpose, the casing 1 comprises at least one means 15 for securing the device 14 to assist installation on the casing 1, this means 15 for securing being able, according to the variant embodiments of the invention, to be formed by an element which is present permanently on the casing 1, and in particular on the tubular wall 4 of the casing, and is used only when the device 14 to assist installation must be secured on the casing, or it is formed by a welding bead provided between the casing 1 and the device 14 to assist installation, the welding bead being unwelded in a second stage after insertion of the sections of packing into the casing 1.

According to a first embodiment, this at least one means 15 for securing can for example have the form of a through-orifice provided in the tubular wall 4 of the casing 1, the orifice being designed to receive a tightening assembly, for example a screw, cooperating with a bolt in order to place against the tubular wall 4 an attachment body 17 for the device 14 to assist installation equipped with holes positioned facing the means 15 for securing provided on the casing. Once the process for installing according to the invention has been completed and the device 14 to assist installation has been removed from the casing 1, the at least one means 15 for securing is distinguished from other securing units, which can make it possible to close the casing by a cover for example, in that it extends in the vicinity of the input opening 10 without a particular function, if applicable closed by a sealing element.

According to a second embodiment, which can be implemented in particular in order to optimise the securing of the cradle 16 on the tubular wall 4 of the casing 1, the at least one means 15 for securing can be in the form of a welding bead formed between a longitudinal end of the tubular wall 4 and the device 14 to assist installation. This welding bead is in particular produced in order to render the device 14 to assist installation integral with the input opening 10 of the casing 1. Advantageously, the welding bead is obtained from edge-to-edge welding between the device 14 to assist installation and the tubular wall 4. In other words, the device 14 to assist installation and the tubular wall 4 are positioned in contact with one another at an end edge, without overlapping of one or the other edge, at the moment of welding between the device 14 to assist installation and the tubular wall 4.

As illustrated in FIG. 1, and shown in particular in FIG. 3, the device 14 to assist installation can comprise a cradle 16 which extends in an extension of at least part of the tubular wall 4, from the input opening 10 in the longitudinal direction L, opposite the base wall 12. In other words, the cradle 16 is in the form of an extension wall projecting from the tubular wall 4, in the vicinity of the longitudinal end of the casing 1 in which the input opening 10 is provided, opposite the base wall 12.

The cradle 16 is in particular configured to receive the section of packing 2 and support it at least partly during the process for installing according to the invention, and in particular before the insertion of the section within the casing.

During the installation process, when the casing 1 is positioned horizontally, the cradle 16 is installed in the extension of a lower portion 18 of the casing 1, this lower portion 18 being considered relative to a vertical direction extending perpendicularly relative to the main plane of extension of the ground on which the said casing 1 is positioned. It is understood that the cradle 16 is positioned at the lower portion 18 of the casing 1, in order to be able to support the section of packing 2 on it, and retain it in position, facing the input opening 10, despite the gravitational force which tends to attract the section of packing toward the ground. In this arrangement, the cradle 16 can support the section of packing 2 such that it remains positioned facing the input opening 10 of the casing 1, in particular during the time taken for the means of transport used to bring the section of packing into this position to be disengaged from the section of packing, and for an appropriate pushing means to be arranged so as to push this section of packing into the casing.

The cradle 16 has a cross-section which is at least partly circular seen on a plane which is perpendicular to the longitudinal direction L, and is inscribed in a circle with a diameter identical to that in which the tubular wall 4 of the casing 1 is inscribed. In other words, the curvature of the cradle 16 is substantially the same as the curvature of the tubular wall 4.

As illustrated, the cross-section of the cradle 16 is globally in the form of an arc of a circle, such as to extend around a portion of the circumference of the input opening 10. More particularly, the cradle 16 extends around at least 25% of the circumference of the input opening 10 of the casing 1, in particular extending on both sides, advantageously symmetrically, from the lower portion of the casing, i.e. the portion of the casing which is closest to the ground on which this casing is supported. Thus, the cradle ensures firstly the support of the section of packing when it is released by the means of transport, and secondly it prevents the section of packing from escaping laterally.

As previously stated, the cradle 16 can be welded edge-to-edge on the casing 1, in the direct extension of the edge which participates in delimiting the input opening 10 of the casing 1, or it can be secured by reversible attachment means, via an attachment body 17, which is thus designed to be in contact with the tubular wall 4 of the casing 1. In each of these variants, the cradle comprises a support portion 19, which forms the projecting part of the casing 1, and has a free end 22 opposite the input opening 10.

If applicable, the attachment body 17 is placed against a face of the tubular wall, in this case the outer face of this tubular wall 4, without this however limiting the invention. The attachment body 17 has a longitudinal dimension which makes it possible to ensure sufficient overlapping of the tubular wall, and to permit stability of the cradle assembly, and more particularly to permit resistance of the securing means 15, without pulling away from the cradle, when the section of packing is supported on the support portion 19 of the cradle.

The support portion 19 of the cradle has a longitudinal dimension, measured between the input opening 10 of the casing 1 and the free end 20, which is between 75 and 150 mm. It is understood in this case that the longitudinal dimension of the cradle 16 is at least 75 mm, in order to make it possible to be able to position the section of packing 2 correctly on the cradle 16 during the installation process.

This longitudinal dimension also corresponds to at least 50% of a longitudinal dimension of the section of packing 2. More particularly, the longitudinal dimension of the cradle can be between 90 and 110 mm, and can be approximately 100 mm.

As previously stated for the second embodiment of the invention, the cradle 16 can have a longitudinal end which is welded on the input opening 10 of the casing 1, this longitudinal end then being able to be unwelded at the end of the assembly process. The removal of the cradle 16 can also be carried out by cutting of the input opening 10 of the casing 1. It is thus understood that the cradle 16 does not comprise an attachment body, as described above.

The cradle 16 comprises at least one metal material, which in particular can consist of stainless steel and/or aluminium.

This type of material thus optimises the solidity of the cradle 16, and its capacity to support the section of packing 2 during the installation process As illustrated in FIG. 1, and as shown in particular in FIG. 3, the device 14 to assist installation can comprise a removable cone 22 which is configured to guide the fitting of the section of packing 2 by centring the said section of packing 2 on the input opening 10.

As previously stated, the removable cone 22 can be welded edge-to-edge on the casing 1, in the direct extension of the edge which participates in delimiting the input opening 10 of the casing 1, or it can be secured by reversible attachment means, via an attachment body 17, which is then designed to be in contact with the tubular wall 4 of the casing 1. In each of these variants, the removable cone 22 comprises a guide portion 21, which forms the projecting part of the casing 1, and has a free edge 24 opposite the input opening 10.

If applicable, the attachment body 17 is placed against the outer face of this tubular wall, without however this limiting the invention. The attachment body 17 has a longitudinal dimension which makes it possible to ensure sufficient overlapping of the tubular wall 4 of the casing 1, and to permit stability of the removable cone 22 assembly, and more particularly to permit resistance of the securing means 15 without pulling away from the removable cone when the section of packing is forced longitudinally against the removable cone in order to be centred.

More specifically, the removable cone 22 is installed at the input opening 10 of the casing 1, and the guide portion 21 of the removable cone 22 forms a frusto-conical portion, the cross-section of which is at least partly circular seen on a plane perpendicular to the longitudinal direction, with this cross-section tending to become enlarged going away from the input opening 10 and the casing as a whole. In other words, taking into consideration a first cross-section of the frusto-conical portion of the removable cone 22, seen on a plane perpendicular to the longitudinal direction L, in the vicinity of the free edge 24 of the removable cone 22, and taking into consideration a second cross-section, seen on a plane perpendicular to the longitudinal direction L, in the vicinity of the input opening 10, the first cross-section of the removable cone 22 is inscribed in a circle with a larger diameter than the circle in which the second cross-section of the removable cone 22 is inscribed.

It is understood in this case that the removable cone 22 is positioned at the input opening 10 of the casing 1 such that, during the process for installing the section of packing 2, the removable cone 22 guides the section of packing 2 by centring it on the input opening 10. The removable cone 22 thus orients the section of packing 2, such that an axis which is parallel to the longitudinal direction L, and passes via the centre of the circle in which the curvature of the outer surface 8 of the section of packing 2 is inscribed, is identical to the axis of revolution of the tubular wall 4 of the casing 1.

Figure 5:
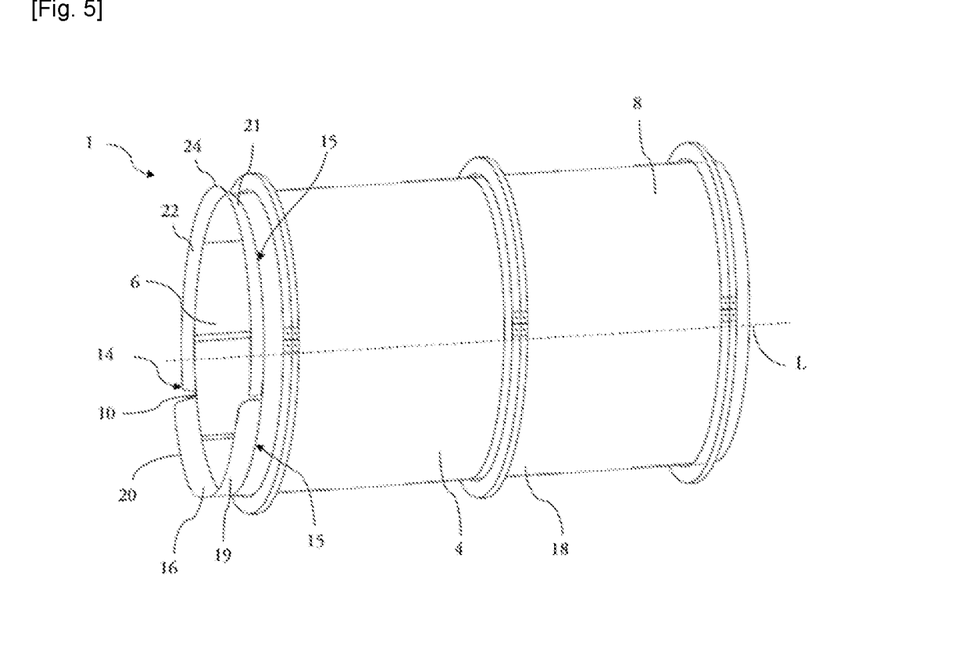
FIG. 5 is a representation in perspective of a variant of the casing implemented in a process for installing a section of packing according to the invention.

According to the variant embodiment of the invention illustrated in FIG. 5, the removable cone 22 has a longitudinal end which is welded edge-to-edge with the edge of the casing delimiting the input opening 10 of the casing 1, this longitudinal end then being able to be unwelded from the casing at the end of the assembly process, i.e. once all the sections of packing have been installed. The removal of the removable cone 22 can also be carried out by cutting of the input opening 10 of the casing 1. It is thus understood that the removable cone 22 does not comprise an attachment body as described above.

The removable cone 22 extends around at least 50% of the circumference of the input opening 10 of the casing 1, and preferably around 67% of this circumference. The cross-section of the removable cone 22 is in this case globally in the form of an arc of a circle, such as to extend around a portion of the circumference of the input opening 10. A circumferential extent of this type of the removable cone 22 is sufficient to centre the section of packing 2 on the input opening 10, and also makes it possible to be able to install the removable cone 22 and the cradle 16 on the periphery of the input opening 10.

In the example illustrated, the cradle 16 and the removable cone 22 extend one after the other, such that their respective attachment bodies 17 together cover substantially all of the circumference of the input opening 10 of the casing 1.

The removable cone 22 has a longitudinal dimension, measured between the input opening 10 of the casing 1 and the free edge 24 of the removable cone 22, of between 30 and 50 mm. This dimension is in particular measured in a direction parallel to the longitudinal direction L, between the edge of the removable cone 22 in contact with the tubular wall 4, and a projection of the free edge 24 of the removable cone 22 in the said direction. The longitudinal dimension is greater than 30 mm, in order to be able to centre the section of packing 2 on the input opening 10 during the positioning step. More particularly, the longitudinal dimension of the frusto-conical portion of the removable cone can be between 30 and 40 mm, and can be approximately 35 mm As a result of the longitudinal dimensions previously given by way of indication for the cradle 16 and the removable cone 22, the longitudinal dimension of the cradle 16 is advantageously larger than the longitudinal dimension of the removable cone 22. The cradle serves the purpose of ensuring any support for the section of packing 2 during the centring of the said section of packing 2 by the removable cone 22. Furthermore, the cradle 16 serves the purpose of supporting the section of packing 2 between the moment when the means of transport, used to bring the section of packing facing the input opening of the casing, releases the section of packing, and the moment when the pushing means, used to insert section of packing within the casing by means of a horizontal push movement, is in contact with the section of packing. The release of the section takes place once the section of packing 2 has been centred by means of the removable cone 22.

The removable cone 22 comprises at least one metal material. Advantageously, the metal material can be stainless steel and/or aluminium.

By means of the material which it comprises, the removable cone 22 is resiliently deformable between a position of centring, under the constraint of the section of packing, and a position of rest which it tends to re-adopt, consequently re-centring the section of packing. This characteristic assists the installation and centring of the section of packing 2 on the input opening 10, while reducing the risk of deterioration of the casing 1 and/or the section of packing 2.

As previously stated, each potential component of the device 14 to assist installation, i.e. the cradle 16 and/or the removable come 22, can have an attachment body 17 which is designed to be placed against the tubular wall of the casing in order to permit the removable securing of the device to assist installation during the process for installing the section of packing according to the invention. More generally, it can be considered that the device to assist installation comprises an attachment body 17 which must be secured on the tubular wall 4 of the casing.

For this purpose, securing holes are provided through the plate forming the attachment body 17, in order to be positioned facing securing means 15, more particularly in this case the orifices, which are present in the tubular portion in the vicinity of the input opening. A tightening assembly, not shown in this case and for example of the screw-nut type, is then used to cooperate with the securing holes of the attachment body 17 and the securing means 15 of the casing, in order to render the cradle 16 and/or the removable cone 22 integral with the casing 1.

As illustrated in FIG. 1, the casing 1 comprises a plurality of securing means 15 which are positioned on the periphery of the tubular wall, or, as illustrated in FIG. 5, the casing 1 can comprise a single securing means extending around the entire periphery of the casing 1 and formed by a welding bead.

A description in greater detail will now be provided of the process for installing the section of packing 2 in the casing 1 by means of a device 14 to assist installation of the section of packing 2, with reference to FIGS. 1 to 5.

As a reminder, the casing 1 is installed horizontally, in order to be able to fit the section of packing 2 in the longitudinal direction L. In addition, and according to the example illustrated here, the casing 1 is equipped with a device 14 to assist installation of the section of packing 2 comprising both a cradle 16 and a removable cone 22. However, a process for installing a section of packing 2 implementing a device 14 to assist installation of a section of packing 2 comprising only the cradle 16 or only the removable cone 22, would not depart from the context of the invention.

According to the invention, the process comprises a step of fitting of the device 14 to assist installation on the casing 1, during which the device 14 to assist installation is secured in the vicinity of the input opening 10 of the casing 1, a step of positioning of the section of packing 2 facing the input opening 10, in cooperation with the device 14 to assist installation, and at least one step of pushing, during which the section of packing 2 is pushed into the receptacle of the casing 1.

The step of fitting of the device 14 to assist installation on the casing 1 is carried out upstream from the step of positioning and the step of pushing. The device 14 to assist installation is advantageously secured in the vicinity of the input opening 10, in order to assist the fitting of the section of packing 2 in the casing 1, such as to reduce the risk of deformation of the casing 1. For example, the device 14 to assist installation is secured by screwing, or by welding if applicable, between the said device 14 to assist installation and the tubular wall 4 of the casing 1, by securing the cradle 16 on the tubular wall 4, then the removable cone 22 on the said tubular wall 4, or conversely.

The assembly process thus comprises a step of fitting of the cradle 16 on the casing 1, during which the cradle 16 is secured on a lower portion 18 of the tubular wall 4 of the casing 1 in the vicinity of the input opening 10, and a step of fitting of a removable cone 22 on an upper part of the tubular wall 4 of the casing 1. The assembly of each of these elements of the device to assist installation is carried out in this case in a similar manner, by positioning the attachment body 17 against the tubular wall 4 of the casing, and allowing to project from the casing the support portion 19 of the cradle and/or the guide portion 21 of the removable cone, then adjusting the position in order for the holes formed in the attachment body 17 to be facing the means 15 for securing of the casing, and finally by tightening the tightening assemblies provided for this purpose passing through the means 15 for securing and the attachment body 17.

In the second embodiment of the invention, the assembly of each of these elements of the device 14 to assist installation is carried out in a similar manner by welding the edge of the cradle 16 and of the removable cone 22 on the edge of the casing 1 participating in delimiting the input opening 10. This edge-to-edge welding makes it possible to be able to leave the support portion 19 of the cradle 16 and/or the guide portion 21 of the removable cone 22 projecting from the casing 1.

It is understood in this case that the securing of the device 14 to assist installation is removable, such that, at the end of the process which will continue to be described, the device 14 to assist installation is separated from the casing 1. Thus, the device 14 to assist installation, and a forteriori the cradle 16 and/or the removable cone 22, can adopt a first position in which the device 14 to assist installation is integral with the casing 1, and a second position in which the device 14 to assist installation is separated from the casing 1.

During the step of positioning of the section of packing 2, the section of packing 2 is positioned relative to the device 14 to assist installation, in order subsequently to facilitate the insertion of the section of packing 2 into the casing 1. In other words, the device 14 to assist installation makes it possible for example to centre the section of packing 2 on the input opening 10, such as to be able to push the section of packing 2 easily into the casing 1, and therefore reduce the friction forces against the inner face 6 of the tubular wall 4.

Advantageously, during the positioning step, a means 26 for transport of the section of packing 2 positions the section of packing 2 on the cradle 16 of the device 14 to assist installation. In the example illustrated, the means of transport is independent from any pushing means implemented subsequently, but it should be noted that these means could be combined in a single installation without this departing from the context of the invention.

The installation process also comprises a step of centring during which, after the positioning step, simultaneously with it, or even if applicable before it, the removable cone 22 participates in centring the section of packing 2 relative to the input opening 10 of the casing 1. During this centring step, the section of packing 2 is offset in the longitudinal direction L towards the base wall 12, with the radial edge of the said section of packing 2 passing along an inner surface of the removable cone 22, in order to be centred on the input opening 10.

Preferably, the centring step is carried out upstream from the positioning step, i.e. the section of packing 2 is firstly centred by the removable cone 22 on the input opening 10 of the casing 1 before being positioned on the cradle 16 of the casing 1, in anticipation of the step of pushing.

It is thus understood that the positioning step makes it possible to go from the centring step to the step of pushing while ensuring that the section of packing 2 is supported, in particular by prevention of vertical displacement of the said section of packing 2, after it has been centred on the input opening 10, and before it is pushed into the receptacle of the casing 1. This positioning step thus provides the time necessary to remove the means of transport 26, which must be disengaged in order not to impede the insertion of the section of packing 2, then to bring a pushing means in contact with the section of packing 2.

Once these steps have been carried out, the section of packing 2 is displaced in the longitudinal direction L towards the base wall 12 of the casing 1 during the step of pushing. A device 28 for pushing the section of packing 2 is provided for this purpose, and can exert a force on the section of packing 2 which is at least sufficient for the section of packing to be displaced into the receptacle of the casing 1. The pushing device 28 is rendered integral with the casing 1 upstream from the step of pushing, in order, when the pushing device 28 displaces the section of packing 2 into the casing 1, to make it possible to retain the casing 1 in position, thus reducing the risk of deformation of the tubular wall 4 and of the casing 1.

As previously stated, the process for installing a section of packing 2 comprises a step of dismantling the device 14 to assist installation, during which the cradle 16 and/or the removable cone 22 are separated from the casing. If applicable, once the sections of packing 2 which are designed to be installed in the casing 1 have been put there, the device 14 to assist installation can be dismantled in order to be refitted on another casing 1 in which the sections of packing 2 must be installed.

In the first embodiment, the device 14 to assist installation is dismantled by separation of the tightening assembly which cooperates with the means 15 for securing and the attachment body 17, such that the device 14 to assist installation is no longer rendered integral with the casing 1.

It should be noted that, in this first embodiment, after the step of dismantling of the device 14 to assist installation of the casing 1, the securing means 15 remain on view on the casing 1 in the vicinity of the input opening 10. The orifices which form the securing means 15 can then be shut by shutting means, thus ensuring the sealing of the gas/liquid separation column which the casing 1 participates in forming.

The step of dismantling of the device 14 to assist installation can consist, in the variant of the invention wherein the securing means 15 are in the form of a welding bead, of an operation of unwelding of the device 14 to assist installation, and/or of cutting of the input opening 10. Advantageously, the unwelding is firstly carried out, then a machining operation is performed in order to render the longitudinal end of the casing 1 smooth around its periphery, such as an operation of deburring for example. It is thus understood that no evidence of the securing of the device 14 to assist installation can be seen on the input opening 10 at the end of the process for installing the section of packing 2.

It is understood from the foregoing that the device 14 to assist installation of a section of packing 2 in the casing 1 is an astute solution for optimising the installation of the said section of packing 2 in the casing 1. This device 14 to assist installation thus prevents the risks of deformation of the tubular wall 4 of the casing 1, by positioning the section of packing 2 correctly relative to the input opening 10 of the casing 1. In addition, this device 14 to assist installation can be fitted on, and/or dismantled from, a casing 1, thus making it possible to be able to use a casing without an appendage projecting at the input opening in a gas/liquid separation column.

However, the present invention is not limited to the means and configurations described and illustrated here, and also extends to any equivalent means and configurations, as well as to any technically operative combination of such means.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it canoe recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for installing a section of packing in a casing by means of a device to assist installation of a section of packing the casing being positioned horizontally during the process for installing the section of packing, wherein the device to assist installation of a section of packing comprises: a removable cone and at least one cradle, the process comprising the steps of:

providing the casing, wherein the casing comprises: at least one tubular wall extending in a longitudinal direction (L) between two longitudinal ends, and an inner face of which participates in delimiting a receptacle for the section of packing, the tubular wall participating in delimiting an input opening at one of its longitudinal ends, wherein the casing further comprises a base wall positioned at the longitudinal end of the tubular wall opposite the input opening;

fitting of the device to assist installation on the casing during which the device to assist installation is secured in the vicinity of the input opening of the casing;

positioning of the section of packing facing the input opening, in cooperation with the device to assist installation; and pushing the section of packing into the receptacle of the casing, wherein the step of fitting of the device to assist installation further includes the steps of:

fitting the removable cone on the casing and at least one step of centering, during which the removable cone centers the section of packing relative to the input opening of the casing; and fitting the at least one cradle on the casing during which the at least one cradle is secured on a lower portion of the casing in the vicinity of the input opening, wherein the at least one cradle is configured to position the section of packing facing the input opening, wherein a longitudinal dimension of the at least one cradle is larger than a longitudinal dimension of the removable cone.

2. The process for installing the section of packing according claim 1, during which, in the step of positioning, a means for transport of the section of packing retains the section of packing facing the input opening, at least until the section of packing is positioned against the device to assist installation.

3. The process for installing the section of packing according claim 1, wherein the casing has a cross-section which is at least partly circular seen on a plane perpendicular to the longitudinal direction (L), wherein the at least one cradle has a cross-section which is at least partly circular seen on a plane perpendicular to the longitudinal direction (L).

4. The process for installing the section of packing according claim 1, wherein the casing has a cross-section which is at least partly circular seen on a plane perpendicular to the longitudinal direction (L), wherein the at least one cradle extends around at least 25% of a circumference of the input opening of the casing.

5. The process for installing the section of packing according claim 1, wherein the longitudinal dimension of the at least one cradle, measured between the input opening of the casing and a free end of the at least one cradle, is between 75 and 150 mm.

6. The process for installing the section of packing according claim 1, wherein the casing has a cross-section which is at least partly circular seen on a plane perpendicular to the longitudinal direction (L), wherein the removable cone extends around at least 50% of a circumference of the input opening of the casing.

7. The process for installing the section of packing according claim 1, wherein the longitudinal dimension of the removable cone, which is measured between the input opening of the casing and a free edge of the removable cone, is between 30 and 50 mm.

8. The process for installing the section of packing according claim 1, wherein the at least one cradle and the removable cone extend one after the other around all of a circumference of the input opening of the casing.

* * * * *